(12) United States Patent
Van Hoose, III et al.

(10) Patent No.: US 10,920,608 B2
(45) Date of Patent: Feb. 16, 2021

(54) DEAD LEG DEBRIS EXTRACTOR FOR CONTINUOUS ON-LINE OPERATION

(71) Applicant: Siemens Energy, Inc., Orlando, FL (US)

(72) Inventors: James R. Van Hoose, III, Orlando, FL (US); Joshua S. McConkey, Orlando, FL (US); Fabio Ipince Petrozzi, La Molina (PE)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/644,694

(22) PCT Filed: Sep. 5, 2018

(86) PCT No.: PCT/US2018/049449
§ 371 (c)(1),
(2) Date: Mar. 5, 2020

(87) PCT Pub. No.: WO2019/050879
PCT Pub. Date: Mar. 14, 2019

(65) Prior Publication Data
US 2020/0291814 A1    Sep. 17, 2020

Related U.S. Application Data

(60) Provisional application No. 62/620,738, filed on Jan. 23, 2018, provisional application No. 62/554,839, filed on Sep. 6, 2017.

(51) Int. Cl.
*F01D 25/00* (2006.01)
*F01D 5/18* (2006.01)
(Continued)

(52) U.S. Cl.
CPC ........... *F01D 25/002* (2013.01); *F01D 5/187* (2013.01); *F01D 25/32* (2013.01); *F02C 7/052* (2013.01); *F05D 2260/607* (2013.01)

(58) Field of Classification Search
CPC ........ F01D 25/002; F01D 25/32; F01D 5/187; F02C 7/052; F05D 2260/607
See application file for complete search history.

(56) References Cited

U.S. PATENT DOCUMENTS 2,806,551 A * 9/1957 Heinrich ................... B04C 3/04
  55/340
5,039,317 A * 8/1991 Thompson ............. B01D 45/16
  55/306

(Continued)

FOREIGN PATENT DOCUMENTS

EP          3106618 A1    12/2016
JP       2012189053 A    10/2012

OTHER PUBLICATIONS

PCT International Search Report and Written Opinion dated Nov. 16, 2018 corresponding to PCT Application No. PCT/US2018/049449 filed Sep. 5, 2018.

*Primary Examiner* — Nathaniel E Wiehe
*Assistant Examiner* — Jackson N Gillenwaters

(57) ABSTRACT

A system and a method for removing debris from a flow path of a cooling flow is provided. The system includes a turbine including at least one airfoil. A cooling flow is communicated to cooling holes via piping that includes a dead leg debris extractor in order to cool the airfoil. The dead leg debris extractor includes a means to capture and retain debris from the cooling flow continuously during online operation of the turbine.

16 Claims, 3 Drawing Sheets

(51) Int. Cl.
*F01D 25/32* (2006.01)
*F02C 7/052* (2006.01)

(56) References Cited

U.S. PATENT DOCUMENTS

| | | | | |
|---|---|---|---|---|
| 7,555,892 | B2 * | 7/2009 | Vosberg | F01D 5/185 |
| | | | | 415/114 |
| 8,176,720 | B2 * | 5/2012 | Beeck | F01D 5/08 |
| | | | | 60/39.092 |
| 9,644,540 | B2 * | 5/2017 | Yamaguchi | F02C 7/22 |
| 9,874,126 | B2 * | 1/2018 | Bailey | F01N 9/002 |
| 2003/0115843 | A1 * | 6/2003 | Haland | B01D 45/16 |
| | | | | 55/392 |
| 2009/0031726 | A1 * | 2/2009 | Greim | B04C 5/04 |
| | | | | 60/657 |
| 2011/0067409 | A1 | 3/2011 | Beeck | |
| 2013/0145747 | A1 * | 6/2013 | Bailey | F01N 3/0233 |
| | | | | 60/274 |
| 2013/0213235 | A1 * | 8/2013 | da Silva | B01D 50/002 |
| | | | | 96/408 |
| 2017/0138263 | A1 * | 5/2017 | Duge | B03C 3/145 |
| 2017/0335721 | A1 * | 11/2017 | Spangler | F02C 3/04 |

* cited by examiner

US 10,920,608 B2

DEAD LEG DEBRIS EXTRACTOR FOR CONTINUOUS ON-LINE OPERATION

CROSS-REFERENCE TO RELATED APPLICATION(S)

This application claims the benefit of U.S. Application No. 62/620,738, filed on Jan. 23, 2018, and U.S. Application No. 62/554,839, filed on Sep. 6, 2017 the contents of which are incorporated by reference herein in its entirety.

BACKGROUND

1. Field

The present disclosure is directed, in general, to removing debris from a flow path, and more particularly, to a system and method for removing debris from the flow path of components having cooling holes.

2. Description of the Related Art

Debris in the form of scaling oxidation can make its way inside turbine airfoils and clog the cooling holes. Clogged cooling holes may result in overheating and breaching of the airfoils, particularly the row two turbine vanes, requiring a forced outage to replace or repair the vanes.

In one approach, an in-line witch hat strainer may be used, which is located inside the cooling air pipes leading to the row two vanes. However, such a strainer may cause an undesirable pressure drop, may clog, and may only be cleaned or inspected by shutting down the unit and removing the section of pipe containing it.

Another approach may include using an in-line cyclonic separator. However, such a separator may need to be tuned for each specific application, is relatively expensive, and may require a significant amount of pipe space compared to other approaches described herein.

Thus, systems to limit or eliminate such clogging are desirable.

SUMMARY

Briefly described, aspects of the present disclosure relate to a system and a method for removing debris from a flow path of a cooling flow.

A first aspect provides a system for removing debris from a flow path of a cooling flow. The system includes at least one airfoil to which a cooling flow is communicated, the cooling flow flowing through the cooling holes in the airfoil to cool the airfoil. The cooling flow is communicated to the cooling holes through piping that includes a dead leg debris extractor. The dead leg debris extractor includes a means to capture and retain debris from the cooling flow continuously during online operation of the turbine.

A second aspect provides a method of removing debris from a cooling flow communicated to cooling holes of an airfoil in a turbine. The method includes installing a dead leg extractor to piping communicating the cooling flow to the cooling holes of the airfoil and extracting debris from the cooling flow via the dead leg extractor continuously during operation of the turbine.

DETAILED DESCRIPTION

Piping dead legs are commonly used in different industrial applications to remove debris or other unwanted substances from a flow path. Typically, the dead leg device is placed on the end of a 90° pipe turn and captures substances which have a higher density than the flow medium by simple inertia. However, dead leg devices typically accumulate debris over time and must be periodically cleaned out while the operating device is offline.

The following describes a further approach to collect such debris, in which a piping dead leg is used to remove and retain debris from a cooling flow path of a turbine engine. Such a dead leg extractor may be placed as described above at the end of a 90° pipe turn and includes features that will capture and retain almost all the debris in the cooling flow path over time. Additionally, the dead leg extractor allows for periodic removal of the retained debris while the turbine is in on-line operation. While a turbine engine and its corresponding vanes and blades are used throughout the disclosure to exemplify the proposed debris extractor, one skilled in the art would understand that the debris extractor may be utilized to remove debris en route via piping to components further downstream and in particular components including holes through which a fluid flows.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Broadly, a system and method for removing debris from a flow path of a cooling flow is proposed. The system includes a turbine having at least one airfoil via which a cooling flow is communicated to cooling holes in the airfoil via piping that includes a dead leg debris extractor. The dead leg debris extractor comprises a dead leg and a cone within the dead leg. The method includes installing the dead leg extractor to the piping communicating the cooling flow to the cooling holes of the airfoil and, during operation of the turbine continuously extracting debris from the cooling flow via the dead leg extractor.

Figure 1:
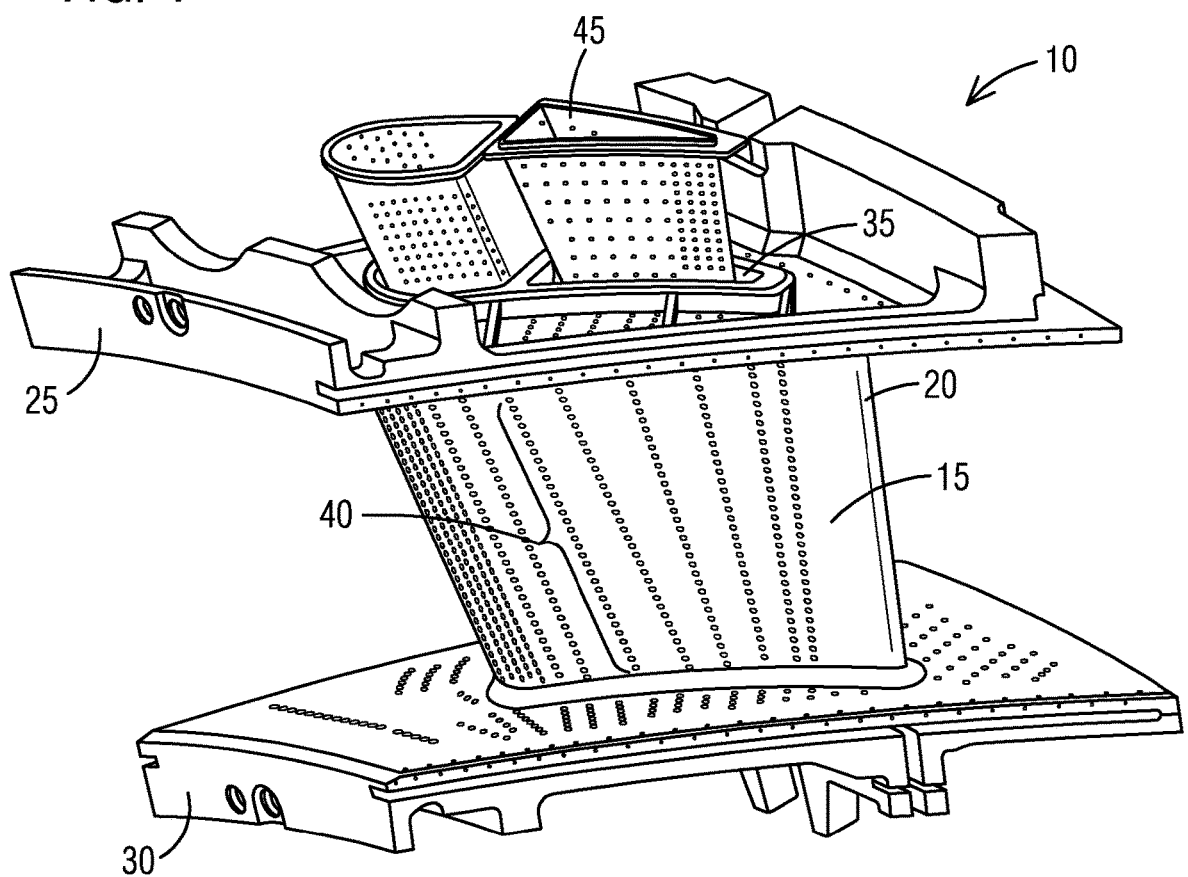
FIG. 1 illustrates a perspective view of a turbine vane assembly including cooling holes in the vane, FIG. 2 includes a perspective view of a turbine engine outer casing with piping that includes a dead leg extractor, FIG. 3 includes a cross sectional view of a dead leg extractor in a vertical orientation, FIG. 4 includes a cross sectional view of a dead leg extractor in a horizontal orientation, and FIG. 5 includes a cross sectional view of an embodiment of dead leg extractor with a plurality of electromagnets.

Referring now to the FIGS. 1-5, a turbine component for a gas turbine engine is shown in FIG. 1 in the form of a stationary turbine vane 10. The vane 10 includes an elongated airfoil having a body 15 with an outer wall 20 and an inner wall. The vane 10 may also include an outer shroud 25 at a first end of the vane 10 and an inner shroud 30, also known as a platform, at a second end of the vane 10. The vane 10 may be configured for use in a gas turbine engine. The body 15 of the vane may define one or more hollow pockets 35 to allow for a cooling fluid to flow therethrough for cooling of the vane 10. The temperatures to which blades and vanes of a gas turbine are exposed due to the flow of hot gas may be upwards of 450° C. and possibly even as high as 1400-1600° C. in the flow path. The more efficiently that heat is removed from the component, the higher the overall efficiency that can be achieved. For this purpose, the vane 10 may additionally include a plurality of cooling holes 40 which are used to cool the internal wall of the vane 10. Extending spanwise within the hollow pockets, the vane 10 may include vane inserts 45 having cooling holes for further cooling.

Figure 2:
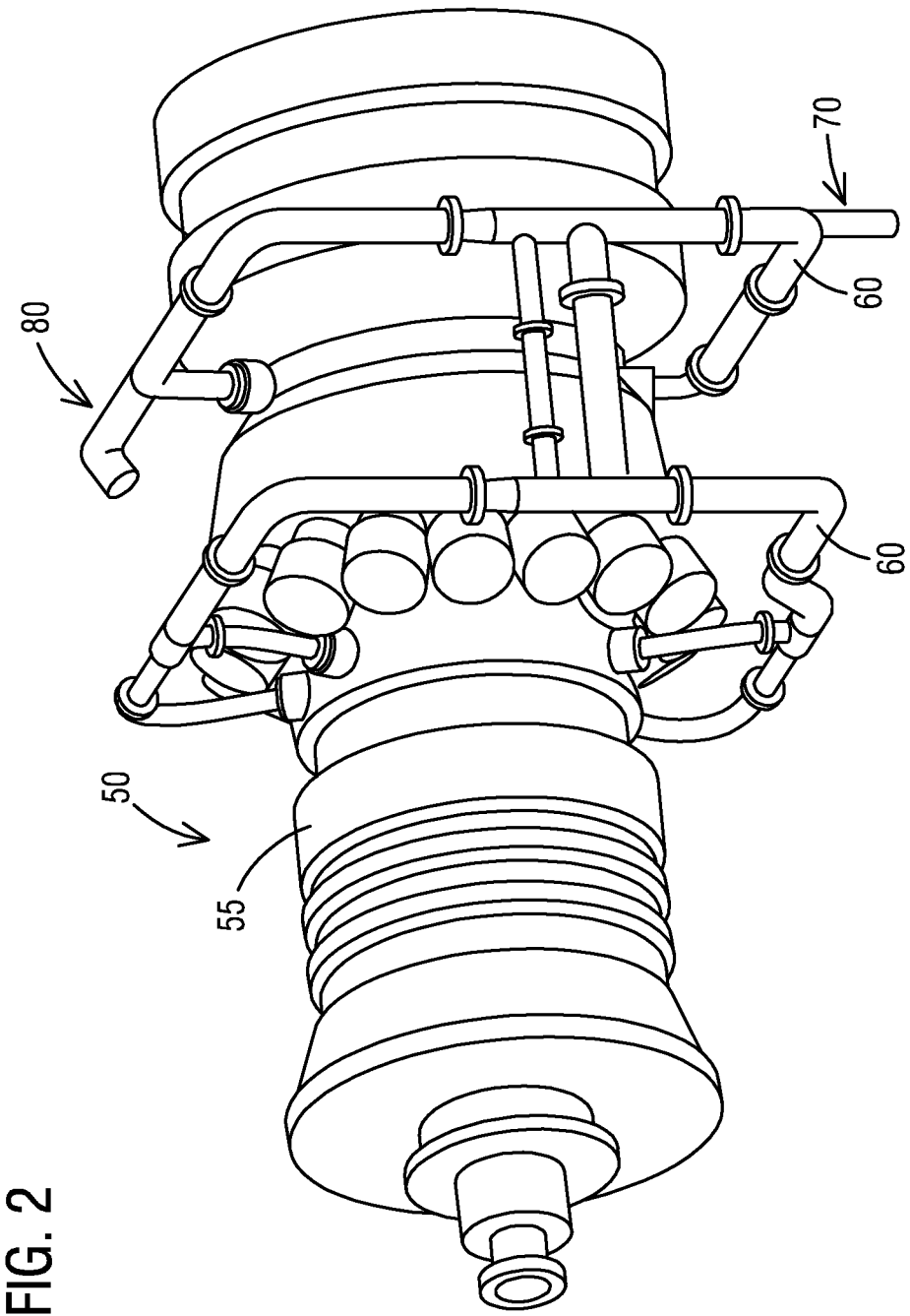

FIG. 2 illustrates a perspective view of a gas turbine engine 50. Piping 60 is attached to the outer casing 55 for the purpose of bleeding cooling air from the compressor section and directing it to the vanes in the turbine section of the engine for cooling purposes. However, as mentioned above, compressor debris in the form of oxidation and airborne particulates, for example, may also exist in the cooling air flow which may clog the cooling holes 40 of the vanes. In order to remove and retain this debris, a dead leg extractor 70,80 may be installed on the existing piping 60 attached to the outer casing 55 of the turbine engine.

Figure 3:
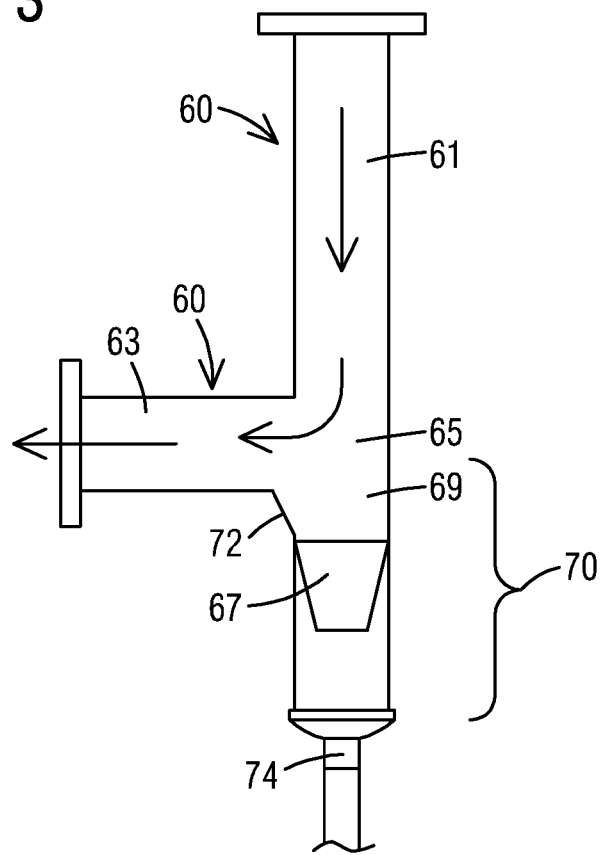
Figure 4:
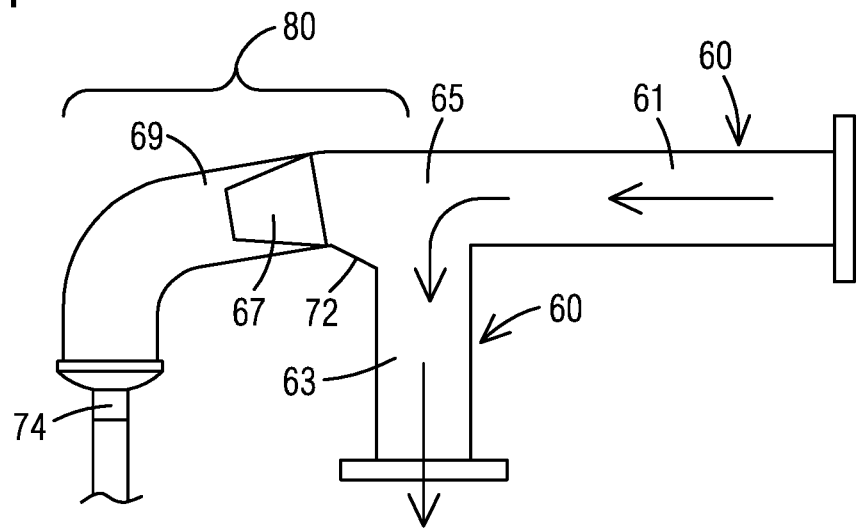

Referring now to FIGS. 3 and 4, cross sectional views of embodiments of the dead leg extractor 70, 80 are shown. FIG. 3 illustrates the dead leg extractor 70 in a vertical orientation and FIG. 4 illustrates a horizontal orientation of the dead leg extractor 80. The embodiments shown include design features that enhance the amount and type of debris captured by the dead leg extractor 70, 80 while retaining the debris and preventing their escape back into the flow stream. Additionally, the embodiments allow for online removal or purging of the debris from the dead leg to permit the turbine 50 to be operated continuously without having to be shut down for dead leg cleaning.

For example, in the vertical embodiment as shown in FIG. 3, a cooling flow (as shown by the arrows) flows vertically through the piping 60 within an inlet pipe 61 until it reaches a piping junction 65. At this junction 65, the cooling air continues to flow within the piping 60 through an outlet pipe 63, as shown by the arrows. Debris, having a higher density than the cooling air flow, by inertia, is projected into a dead leg extractor 70. As illustrated in FIG. 3, the dead leg extractor 70 may comprise a dead leg 69, which may be a vertical extension of the inlet pipe 61 from the junction 65 as shown, and a ringed pipe segment 67. In an embodiment, as shown in FIG. 3, the ringed pipe segment 67 is a cone.

In an embodiment, the cone 67 in the dead leg extractor 70, 80 functions as a means to capture and retain the debris that enters the dead leg 69. The incorporation of a cone geometry in the dead leg 69 has been shown through laboratory testing to significantly reduce the amount of debris lost over time once captured in the dead leg 69, especially micron sized debris. In an embodiment, the cone 67 includes a first opening through which a flow containing debris enters, a smaller second opening through which the flow exits and a height. An outer diameter of the cone 67 at the first opening may abut an inner diameter of the dead leg pipe 69 such that the entire flow enters the first opening. In an embodiment, the height of the cone lies in a range of 8.5 to 16.5 in. In another embodiment, the second opening of the cone lies in a range of 4 to 6 in. While some ranges have been given, it should be appreciated that other cone geometries may be used depending on the flow characteristics and piping characteristics involved in the implementation.

In an embodiment, the system may include a cutback feature 72. Testing has shown that approximately 10% of the debris would impinge on the corner of the joint at the junction 65 and flow downstream into the outlet pipe 63 with the cooling flow without such a cutback feature. With a cutback feature 72, the debris is more likely to enter the dead leg 69 instead. The cutback feature 72 may comprise angling the pipe at the lower portion of the joint so that debris is drawn down into the dead leg 69.

In an embodiment, the system may include the incorporation of a blow down valve 74 connected at an end of the dead leg 70, 80 opposite the junction 65. The blow down valve 74 may open periodically on a timer in order to blow out debris. The blow down valve 74 allows the dead leg 69 to be purged of debris (due to the positive internal pressure) while the system is operating. The purged debris may be disposed into a solid waste container, for example. No shut down would be required to clean the dead leg 69, as would be case with a traditional filter application such as the witch hat implementation.

In the illustrated embodiments shown in FIGS. 3 and 4, the pipe geometry may be optimized for both vertically and horizontally oriented dead legs 70, 80 to maximize debris capture and retention. In the horizontal embodiment of the dead leg extractor 80, a horizontal portion of the dead leg containing the cone 67 may have a slight downward slope ending in an elbow that flows into a vertically oriented portion of the dead leg 69. A blow down valve 74 may be disposed at the end of the vertically oriented portion. The slight downward slope allows gravity to prevent debris from accumulating underneath the cone 67, instead drawing it towards the blow down valve 74. In an embodiment, the slight downward slope lies in a range of 5-15 degrees.

Figure 5:
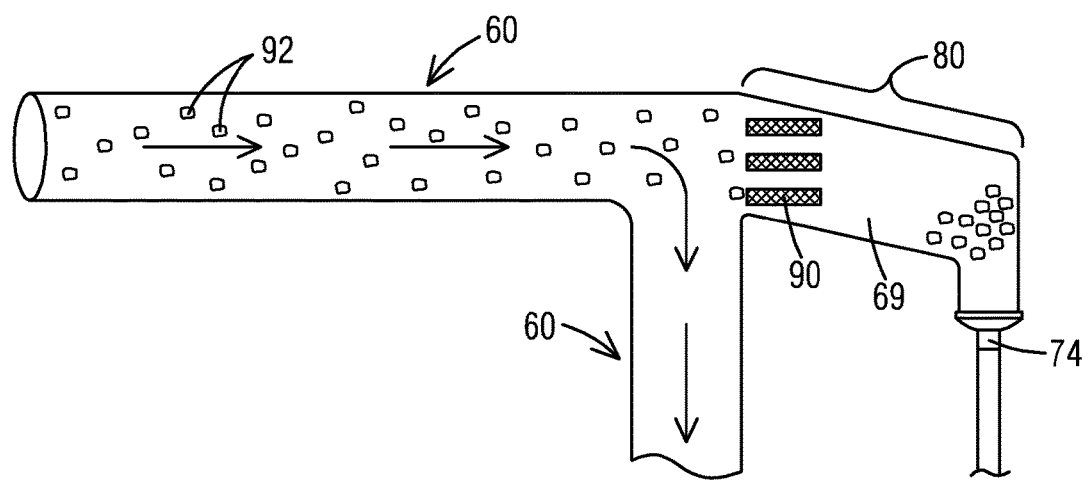

In an embodiment as shown in FIG. 5, the dead leg 69 includes a plurality of electromagnets 90 disposed at the entrance of the dead leg 69 utilized to attract magnetic debris particles 92 from the cooling flow drawing the debris into the dead leg 69. The electromagnets 90 may include magnetic cores wound with wires so that when a current is applied to the wires a strongly attractive magnetic field pulls the particles 92 into the dead leg 69. In coordination with the extraction of the debris through the blow down valve 74, the electromagnets 90 may be turned off at which time the magnetic particles 92 adhering to them will fall off and pass through the opened blow down valve 74.

The proposed system and method reduces the risk of downstream damage, particularly to vanes of a gas turbine, in a turbine system. Advantageously, the proposed dead leg extractor can be implemented quickly, causes little if any decrease in cooling flow, carries low risk, takes up little piping space and requires little if any maintenance. For example, the dead leg extractor may simply be installed onto the existing piping of a gas turbine engine as shown in the FIG. 2. The dead leg extractor is further relatively inexpensive to manufacture and provides a simple solution that may be installed on newly manufactured turbines as well as already existing turbines.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for removing debris from a flow path of a cooling flow, comprising:
   a turbine including at least one airfoil to which a cooling flow is communicated, the cooling flow flowing through a plurality of cooling holes in the airfoil to cool the airfoil, wherein the cooling flow is communicated to the plurality of cooling holes via piping that includes a dead leg debris extractor, wherein the dead leg debris extractor includes a means to capture and retain debris from the cooling flow continuously during online operation of the turbine, wherein the dead leg debris extractor comprises a dead leg and a cone within the dead leg so that the cone is enclosed by a piping of the dead leg, and wherein the dead leg extractor includes a cutback at a junction between an inlet pipe, an outlet pipe, and the dead leg, and wherein the cutback includes an angled portion in the piping at the junction between the inlet pipe and the outlet pipe so that debris is drawn down into the dead leg.

2. The system as claimed in claim 1, wherein the cone includes a first opening through which the cooling flow enters, a smaller, second opening through which the cooling flow exits, and a height, wherein an outer diameter of the cone at the first opening abuts an inner diameter of the dead leg extractor such that the entire cooling flow enters the first opening, and wherein the cone captures debris from the cooling flow and retains the debris in the dead leg.

3. The system as claimed in claim 2, wherein the height of the cone is in a range of 8.5 in. to 16.5 in.

4. The system as claimed in claim 2, wherein the diameter of the second opening is in a range of 4-6 in.

5. The system as claimed in claim 1, wherein the dead leg extractor includes a blow down valve configured to allow for removal of captured debris during operation of the turbine.

6. The system as claimed in claim 1, wherein the dead leg extractor includes a vertical orientation.

7. The system as claimed in claim 1, wherein the dead leg extractor includes a horizontal orientation.

8. The system as claimed in claim 7, wherein the horizontal orientation of the dead leg extractor includes a portion with a slight downward slope containing the cone connected to a vertical portion containing the blow down valve.

9. The system as claimed in claim 7, wherein the slight downward slope lies in a range of 5-15 degrees.

10. The system as claimed in claim 1, wherein the dead leg further includes a plurality of electromagnets disposed at an entrance to the dead leg, and, wherein the plurality of electromagnets attract metallic debris particles from the cooling flow into the dead leg.

11. The system as claimed in claim 1, wherein the airfoil is a turbine vane.

12. A method of removing debris from a cooling flow communicated to cooling holes of an airfoil in a turbine, comprising:

installing a dead leg extractor to piping communicating the cooling flow to a plurality of cooling holes of the airfoil; and extracting debris from the cooling flow via the dead leg extractor continuously during operation of the turbine, wherein the dead leg extractor comprises a dead leg and a cone disposed within the dead leg so that the cone is enclosed by a piping of the dead leg, wherein the dead leg extractor further includes a cutback at a junction between an inlet pipe, an outlet pipe, and the dead leg, wherein the cutback includes an angled portion in the piping at the junction between the inlet pipe and the outlet pipe so that debris is drawn down into the dead leg.

13. The method as claimed in claim 12, further comprising cleaning out debris in the dead leg extractor by opening a blow down valve.

14. The method as claimed in claim 13, further comprising cleaning out debris in the dead leg by periodically opening the blow down valve automatically on a timer via a controller.

15. The method as claimed in claim 12, wherein a flow containing debris enters into the cone within the dead leg and is retained within a portion of the dead leg between the cone and a blow down valve.

16. The method as claimed in claim 12, wherein the airfoil is a turbine vane.

* * * * *